(12) United States Patent
Baecklund et al.

(10) Patent No.: US 9,600,598 B2
(45) Date of Patent: Mar. 21, 2017

(54) COMPUTING SYSTEM WITH SOCIAL INTERACTION MECHANISM AND METHOD OF OPERATION THEREOF

(71) Applicant: Samsung Electronics Co., Ltd., Gyeonggi-Do (KR)

(72) Inventors: Tao C. Baecklund, San Jose, CA (US); Curtis Jyun Sasaki, Sunnyvale, CA (US); Kuldip S. Pabla, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 489 days.

(21) Appl. No.: 14/056,599

(22) Filed: Oct. 17, 2013

(65) Prior Publication Data
US 2014/0280359 A1    Sep. 18, 2014

Related U.S. Application Data

(60) Provisional application No. 61/782,404, filed on Mar. 14, 2013.

(51) Int. Cl.
| | | |
|---|---|---|
| *G06F 17/30* | (2006.01) | |
| *G06Q 10/00* | (2012.01) | |
| *G06Q 30/02* | (2012.01) | |
| *G06Q 50/00* | (2012.01) | |

(52) U.S. Cl.
CPC .. *G06F 17/30958* (2013.01); *G06F 17/30587* (2013.01); *G06Q 10/00* (2013.01); *G06Q 30/02* (2013.01); *G06Q 50/01* (2013.01)

(58) Field of Classification Search
CPC ........ G06F 17/30958; G06F 17/30587; G06Q 10/00; G06Q 30/02; G06Q 50/01
USPC ............................................ 707/798
See application file for complete search history.

(56) References Cited

U.S. PATENT DOCUMENTS

| | | | |
|---|---|---|---|
| 8,019,766 B2 | 9/2011 | Chan et al. | |
| 8,306,908 B1 | 11/2012 | Barker et al. | |
| 8,346,625 B2 | 1/2013 | Song | |
| 9,020,965 B1* | 4/2015 | Sehrer | G06Q 50/01 707/758 |
| 9,083,670 B1* | 7/2015 | Boncha | H04L 51/32 |
| 2007/0233635 A1* | 10/2007 | Burfeind | G06Q 10/109 |
| 2008/0097999 A1* | 4/2008 | Horan | G06Q 10/10 707/999.01 |
| 2010/0274855 A1 | 10/2010 | Wassingbo | |
| 2010/0325214 A1* | 12/2010 | Gupta | G06Q 10/10 709/206 |
| 2011/0179161 A1* | 7/2011 | Guy | G06Q 30/02 709/224 |
| 2012/0015746 A1* | 1/2012 | Mooney | A63F 13/12 463/42 |

(Continued)

*Primary Examiner* — Rehana Perveen
*Assistant Examiner* — Tiffany Thuy Bui
(74) *Attorney, Agent, or Firm* — IP Investment Law Group

(57) ABSTRACT

A computing system includes: a control unit configured to: detect an upcoming event for interacting with a focal person for the upcoming event; extract an invitee's identification for the upcoming event, aggregate an invitee's information associated with the invitee's identification; build a social graph as an enhanced graph or with an extension graph based on the invitee's information for adding an invitee associated with the invitee's identification; and a storage unit, coupled to the control unit, configured to store the social graph.

27 Claims, 8 Drawing Sheets

(56) References Cited

U.S. PATENT DOCUMENTS

| | | | |
|---|---|---|---|
| 2012/0225723 A1 | 9/2012 | Webster et al. | |
| 2013/0036230 A1* | 2/2013 | Bakos | H04L 67/22 709/227 |
| 2013/0156274 A1* | 6/2013 | Buchmueller | G06Q 50/01 382/118 |
| 2013/0159132 A1* | 6/2013 | Adams | G06Q 50/01 705/26.7 |
| 2013/0227011 A1* | 8/2013 | Sharma | G06Q 50/01 709/204 |
| 2013/0332308 A1* | 12/2013 | Linden | G06Q 30/0631 705/26.7 |
| 2014/0012927 A1* | 1/2014 | Gertzfield | G06Q 50/01 709/206 |
| 2014/0052539 A1* | 2/2014 | Lauback | G06Q 30/0255 705/14.66 |
| 2014/0095597 A1* | 4/2014 | McNeil | G06Q 50/01 709/204 |
| 2014/0129505 A1* | 5/2014 | Lin | G06Q 50/01 706/50 |
| 2015/0127565 A1* | 5/2015 | Chevalier | G06Q 10/00 705/319 |

\* cited by examiner

COMPUTING SYSTEM WITH SOCIAL INTERACTION MECHANISM AND METHOD OF OPERATION THEREOF

CROSS-REFERENCE TO RELATED APPLICATION(S)

This application claims the benefit of U.S. Provisional Patent Application Ser. No. 67/782,404 filed Mar. 14, 2013, and the subject matter thereof is incorporated herein by reference thereto.

TECHNICAL FIELD

An embodiment of the present invention relates generally to a computing system, and more particularly to a system for social interaction.

BACKGROUND

Modern consumer and industrial electronics, especially devices such as graphical computing systems, televisions, projectors, cellular phones, smart phones, and combination devices, are providing increasing levels of functionality to support modern life including interconnecting to vast amount of information. Research and development in the existing technologies can take a myriad of different directions.

The explosion of information and connectivity can overwhelm a person. This can result in less than optimal if not lost opportunities due to not appropriately using the appropriate information at the appropriate times.

Thus, a need still remains for a computing system with social interaction mechanism to display aide users to interact with others more appropriately. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a control unit configured to: detect an upcoming event for interacting with a focal person for the upcoming event; extract an invitee's identification for the upcoming event, aggregate an invitee's information associated with the invitee's identification; build a social graph as an enhanced graph or with an extension graph based on the invitee's information for adding an invitee associated with the invitee's identification; and a storage unit, coupled to the control unit, configured to store the social graph.

An embodiment of the present invention provides a method of operation of a computing system including: detecting, using a control unit, an upcoming event for interacting with a focal person for the upcoming event; extracting an invitee's identification for the upcoming event; aggregating an invitee's information associated with the invitee's identification; building a social graph as an enhanced graph or with an extension graph based on the invitee's information for adding an invitee associated with the invitee's identification; and storing the social graph.

An embodiment of the present invention provides a non-transitory computer readable medium including: detecting an upcoming event for interacting with a focal person for the upcoming event; extracting an invitee's identification for the upcoming event; aggregating an invitee's information associated with the invitee's identification; building a social graph as an enhanced graph or with an extension graph based on the invitee's information for adding an invitee associated with the invitee's identification; and storing the social graph.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
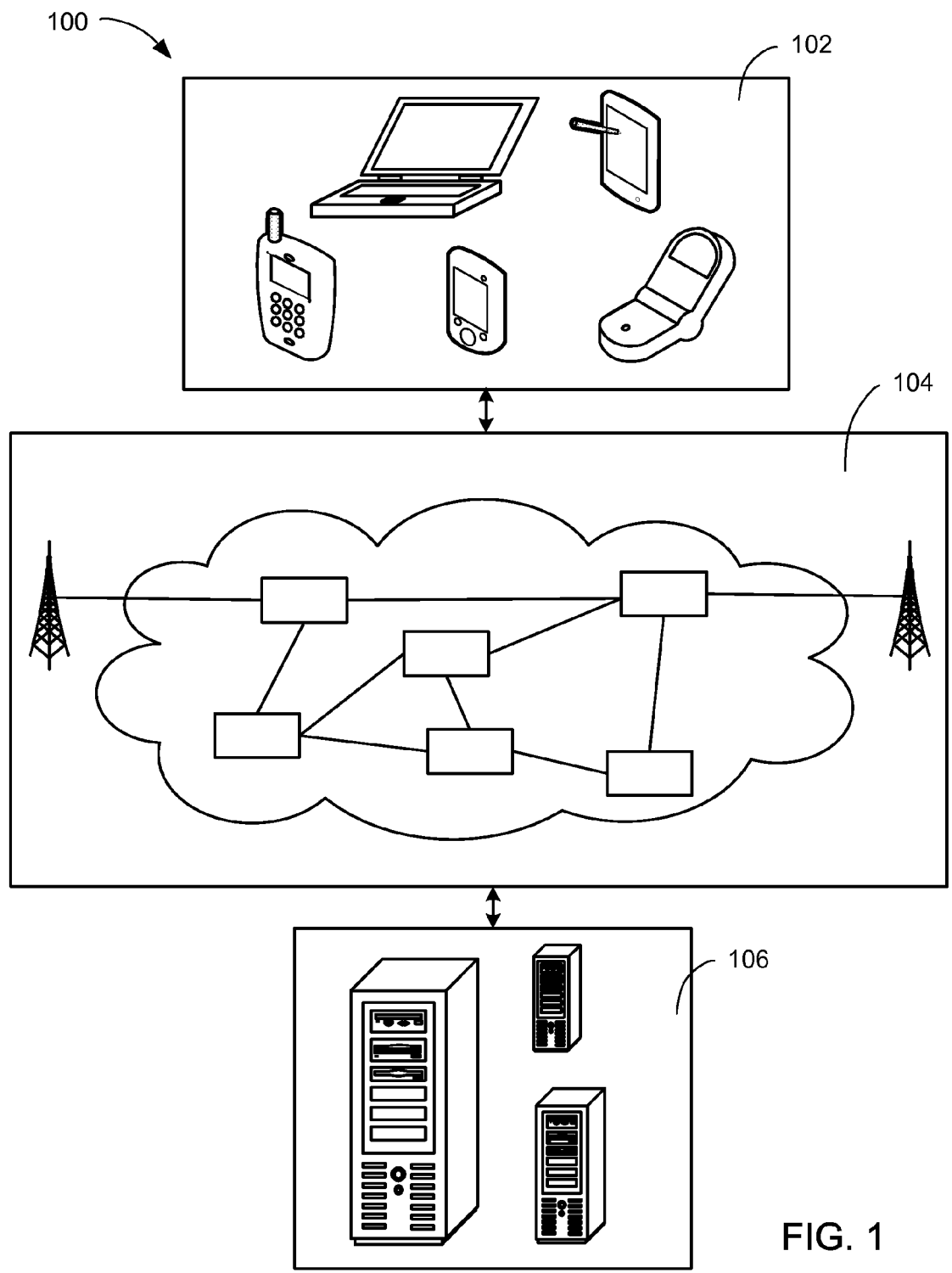
FIG. 1 is a computing system with social interaction mechanism in an embodiment of the present invention.

An embodiment of the present invention provides improved interaction opportunities with new or stale contacts. The computing system aggregates information from various sources to help create context for a conversation for the user to connect with a new contact or to reconnect with a stale contact, as described as the search target or one of the invitees in the example earlier, derived originally from the event details of the upcoming event.

An embodiment of the present invention provides the opportunity for improved interactions between a new contact and a stale contact while preserving privacy. The tiered sharing protocol can provide tiered details of information exchanges between the user and the search target using the initial interaction request, the detailed interaction request, and responses from the search target.

An embodiment of the present invention provides an efficient query and response exchange for determining an acceptance of the future interaction opportunity based on the degree of separation between the user and the search target. The closer the user and the search target are, the lower the value for the degree of separation allowing the computing system to more quickly provide specific information for the future interaction opportunity while minimizing the exchanges using the initial interaction request, the detailed interaction request, or a combination thereof.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with social interaction mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a cellular phone, personal digital assistant, a notebook computer, a smart phone, a computer tablet, or other multi-functional display or entertainment device. The first device 102 can couple, either directly or indirectly, to the communication path 104 to communicate with the second device 106 or can be a stand-alone device.

For illustrative purposes, the computing system 100 is described with the first device 102 as a mobile device, although it is understood that the first device 102 can be different types of devices. For example, the first device 102 can also be a non-mobile or a stationary device, such as a server, a desktop computer, or cloud computing.

The second device 106 can be any of a variety of centralized or decentralized computing devices, or transmission devices. For example, the second device 106 can be a computer, a laptop computer, a desktop computer, a video game console, grid-computing resources, a virtualized computer resource, cloud computing resource, routers, switches, peer-to-peer distributed computing devices, a media playback device, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks and a variety of network topologies. For example, the communication path 104 can include wireless communication, wired communication, optical, ultrasonic, or the combination thereof. Satellite communication, cellular communication, Bluetooth™, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
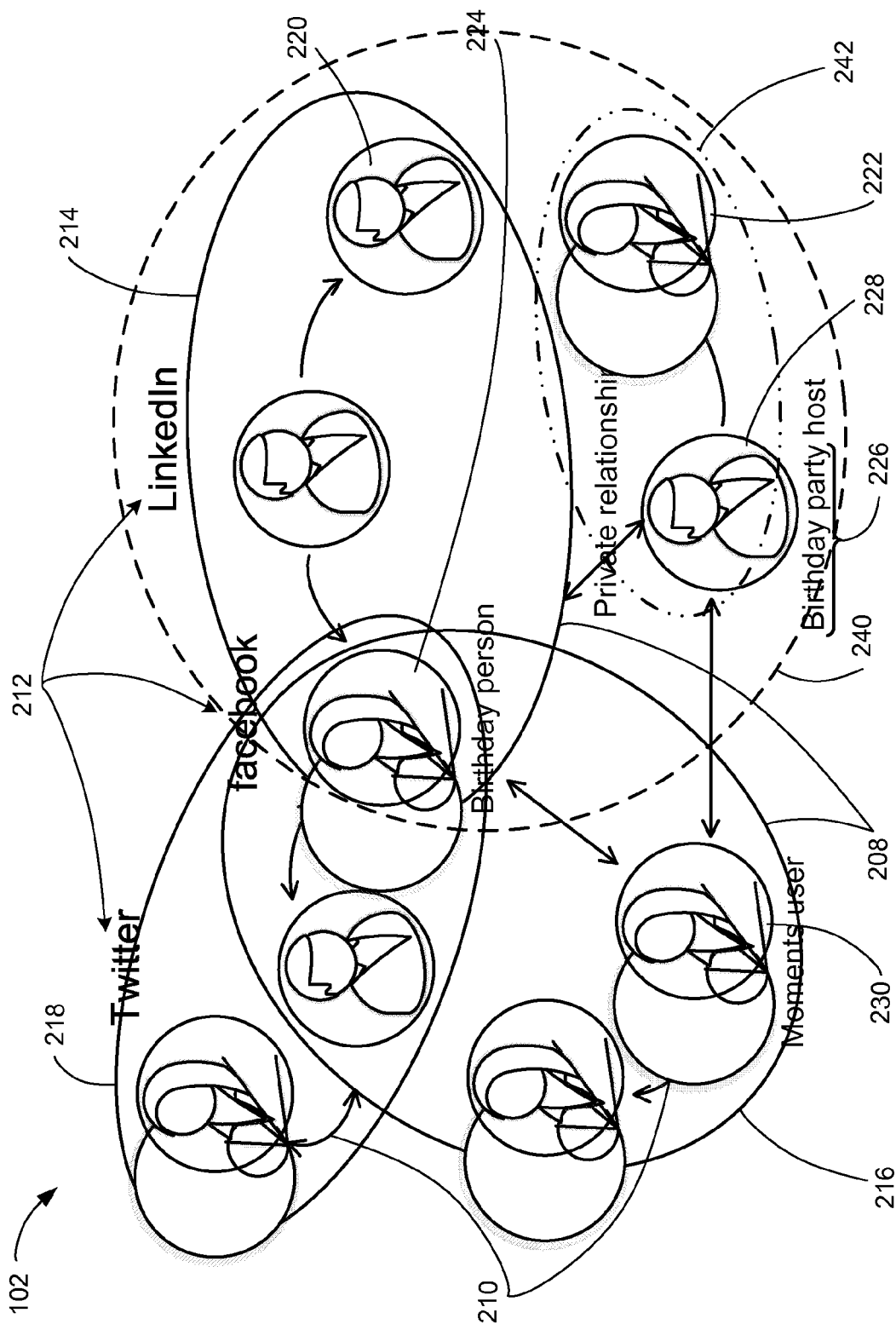
FIG. 2 is an exemplary topology view of social networks displayed on the first device.

Referring now to FIG. 2, therein is shown an exemplary topology view of social networks 208 displayed on the first device 102. The social networks 208 can also be displayed on the second device 106 of FIG. 1, as an example. The social networks 208 convey the relationship between individuals. FIG. 2 depicts, as an example, social graphs 210. Each of the social graphs 210 is an organization or a representation for each of the social networks 208.

In this example, there are a number of network types 212 and each of the social graphs 210 depicts with a different form of the network types 212. Each of the network types 212 provides a classification for a particular social network. FIG. 2 depicts the network types 212 to include a professional network 214 and a non-professional network 216. The professional network 214 is used primarily for relationships for one's profession or in a work context. The non-professional network 216 is used primarily used for non-work relationships. An example for the professional network 214 is depicted in FIG. 2 as LinkedIn™. An example for the non-professional network 216 is depicted in FIG. 2 as Facebook™.

For illustrative purposes, FIG. 2 depicts the social networks 208 as two types of the network types 212 with the professional network 214 and the non-professional network 216, although it is understood that the computing system 100 can have different configurations and types for the social networks 208. For example, there can be more than one instance or types of the professional network 214 and the non-professional network 216. Also for example, FIG. 2 depicts another form of the network types 212 as an interest network 218. The interest network 218 is primarily used to follow a particular topic or person. FIG. 2 depicts an example of the interest network 218 as Twitter™.

The topology view also depicts individuals that are in-network 220 and out-of-network 222. The in-network 220 refers to a classification for individuals who are in at least one of the social networks 208 or part of one of the social graphs 210. The out-of-network 222 refers a classification for individuals who are not in any of the social networks 208 depicted in FIG. 2 or part of one of the social graphs 210 depicted in FIG. 2.

For illustrative purposes, the computing system 100 is described with individuals being classified as within the in-network 220 or as the out-of-network 222 with respect to the social networks 208 or the social graphs 210, although it is understood that the computing system 100 can be configured differently. For example, an individual who is classified with the out-of-network 222 depicted in FIG. 2 can be part of another social network not depicted in FIG. 2. In other words, a person is not necessary absent from any social networks * but rather not within one of the social networks 208 depicted in FIG. 2. Similarly, an individual who is classified with the in-network 220 can be not part of other social networks 208 not depicted in FIG. 2 but rather within one of the social networks 208 depicted in FIG. 2.

In this example, a focal person 224 is shown being part of the professional network 214, the non-professional network 216, and the interest network 218. The focal person 224 is the individual of focus for an upcoming event 226. The upcoming event 226 is an activity that has not yet occurred. The focal person 224, for this example, is the birthday person and the upcoming event 226, which is a birthday party.

An event organizer 228 is a person responsible for the upcoming event 226. In this example, the event organizer 228 is the birthday party host. FIG. 2 depicts the event organizer 228 with the classification as the out-of-network 222 or having a private relationship with the focal person 224. FIG. 2 depicts the event organizer 228 also having a relationship with another individual that is not part of the social networks 208 in FIG. 2 or classified as the out-of-network 222. The computing system 100 can create an enhanced graph 240 or an extended graph 242 for those that are currently out-of-network 222. The enhanced graph 240 is a new social graph. The extension graph 242 is also a social graph as an addition or modification to an existing social graph. Both the enhanced graph 240 and the extended graph 242 will be described more later. The event organizer 228 is also shown having a relationship with another person, who is part of the non-professional network 216 and is a user 230 of the computing system 100, in this example.

Figure 3:
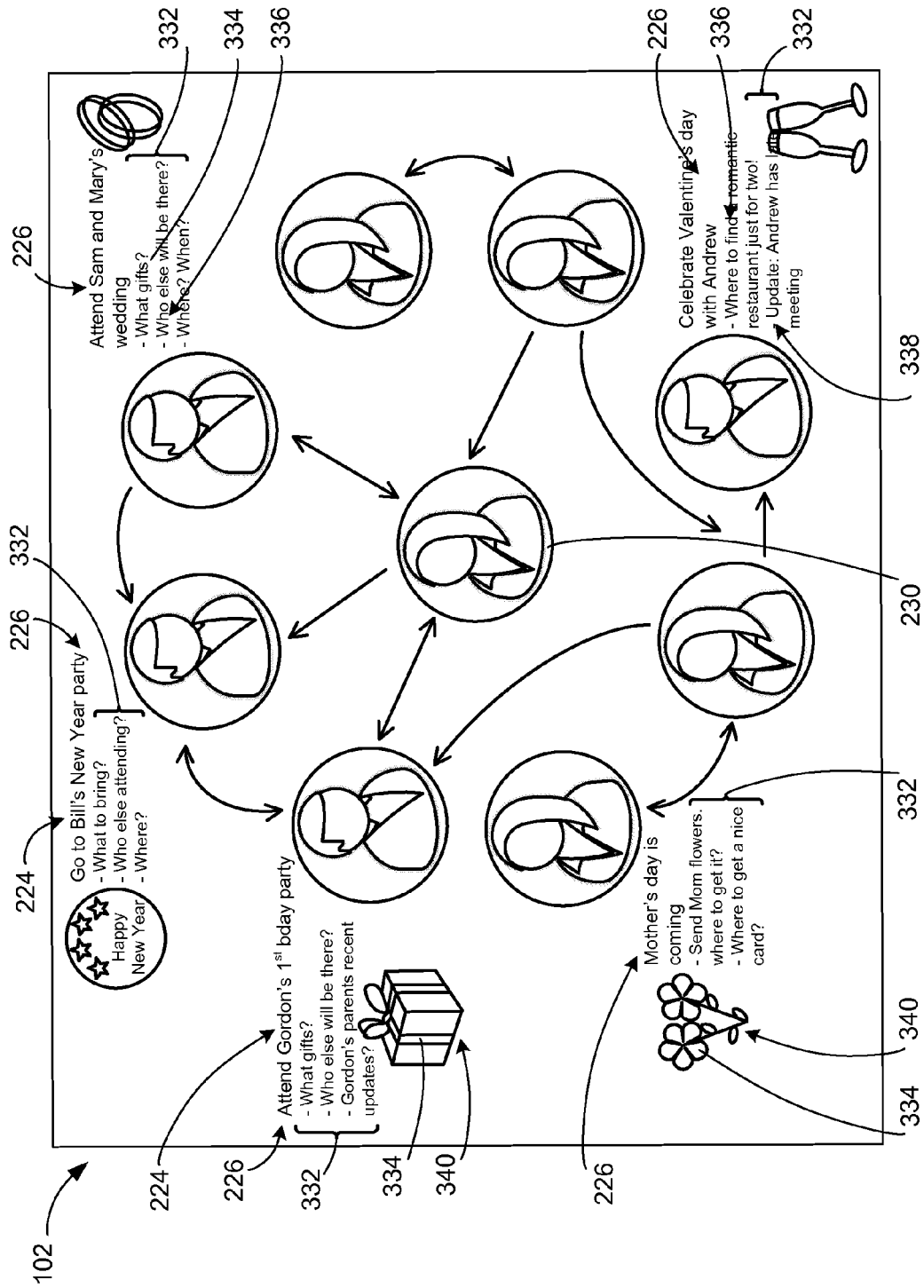
FIG. 3 is an exemplary topology view of the social networks with events displayed on the first device.

Referring now to FIG. 3, therein is shown an exemplary topology view of the social networks 208 with events displayed on the first device 102. Examples of the upcoming event 226 are depicted including a birthday party, a New Year party, a wedding, Mother's Day, or Valentine's Day. FIG. 3 depicts the user 230 of the computing system 100 in a central location to the other individuals with each person being the focal person 224 of the particular example of the upcoming event 226. However, the user 230 is shown not have a direct relationship with the focal person 224 for each of the upcoming event 226 depicted in FIG. 3 but does have a direct relationship with someone who has a direct relationship with that person.

The upcoming event 226 can include event details 332. The event details 332 provide information about the particular activity. The event details 332 can differ in the type and amount of information from one instance of the upcoming event 226 to a different instance of the upcoming event 226 based on the type of event or context of the event or even based on the individuals involved in the event, as examples.

In the example for the New Year party depicted in FIG. 3, the event details 332 for the upcoming event 226 can include or involve item selections 334 for the upcoming event 226. The item selections 334 are information regarding objects relating to the upcoming event 226. The relationship can vary based on the context or the type of the upcoming event 226. For the New Year party example, the item selections 334 can relate to a celebratory atmosphere or setting for a New Year party or the theme with Father Time. The object for the item selections 334 can be props to help with these atmosphere or theme, such as a bottle of Champagne or a costume to dress up as Father Time.

Continuing with the New Year party, the event details 332 can also provide information regarding invitees 336 to the upcoming event 226. The invitees 336 are individuals that are invited to the upcoming event 226 or have been noted to potentially be part of the upcoming event 226.

For the birthday party example depicted in FIG. 3, the upcoming event 226 also include the event details 332 similar to the New Year party example with the invitees 336 and the item selections 334. To assist the user 230 to select the item selections 334 or gifts more appropriate for the occasion, the event details 332 can include event updates 338. The event updates 338 are information providing recent or current information relating to the upcoming event 226. In this example, if the upcoming event 226 is a birthday party for the focal person 224 who is a one-year old baby, then the event organizer 228 will likely be the parents of the baby. The computing system 100 can extract information from the event details 332 if provided by the event organizer 228 or can gather information relating to the upcoming event 226 and the event organizer 228. More details will be discussed below about the computing system 100 gathering and aggregating more information about the event organizer 228 or other folks or information.

For the wedding example depicted in FIG. 3, the upcoming event 226 also include the event details 332 for the item selections 334, such as information about gifts, or about the invitees 336. The event details 332 can also include other information such as location and time or day for the upcoming event 226.

For the Mother's Day example depicted in FIG. 3, the upcoming event 226 can include the event details 332, which can be reminders for the upcoming event 226. In this example, the upcoming event 226 can be a regular, annual activity. The computing system 100 can provide recommendations 340 for the item selections 334, such as a location to purchase flowers or where to buy a nice card. More details about the generation of the recommendations 340 will be described later.

For the Valentine's Day example depicted in FIG. 3, the upcoming event 226 can include the invitees 336 or in this case one person to share the Valentine celebration. The computing system 100 can provide the recommendations 340 based on the context of the type of the upcoming event 226 as being an intimate annual event.

Figure 4:
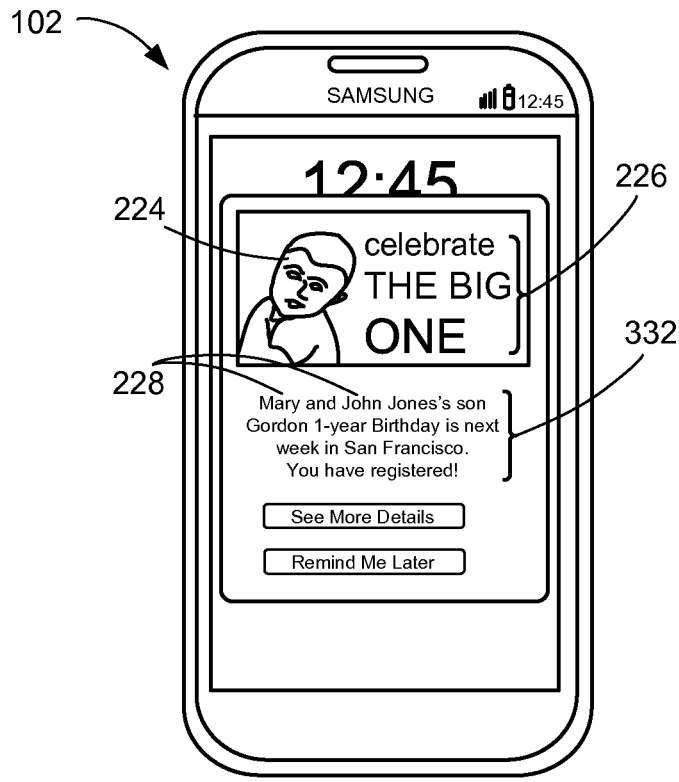
FIG. 4 is an exemplary display the upcoming event displayed on the first device.

Referring now to FIG. 4, therein is shown an exemplary display of the upcoming event 226 displayed on the first device 102. FIG. 4 depicts the exemplary display as a user interface on the first device 102. FIG. 4 is an example of the upcoming event 226 as a birthday party for a one-year old baby, as discussed in FIG. 3.

The display depicts an image or picture of the focal person 224 or the birthday baby. The display can also depict other types of the event details 332, such as the subject or purpose of the upcoming event 226 as celebrating the first birthday of the focal person 224. The display can depict the event organizer 228 as the parents, the time of the party, as well as the location as examples for the event details 332. The display can also provide an action icon to provide even more details or information about the upcoming event 226. The display can also provide an option to be reminded later about the upcoming event 226.

Figure 5:
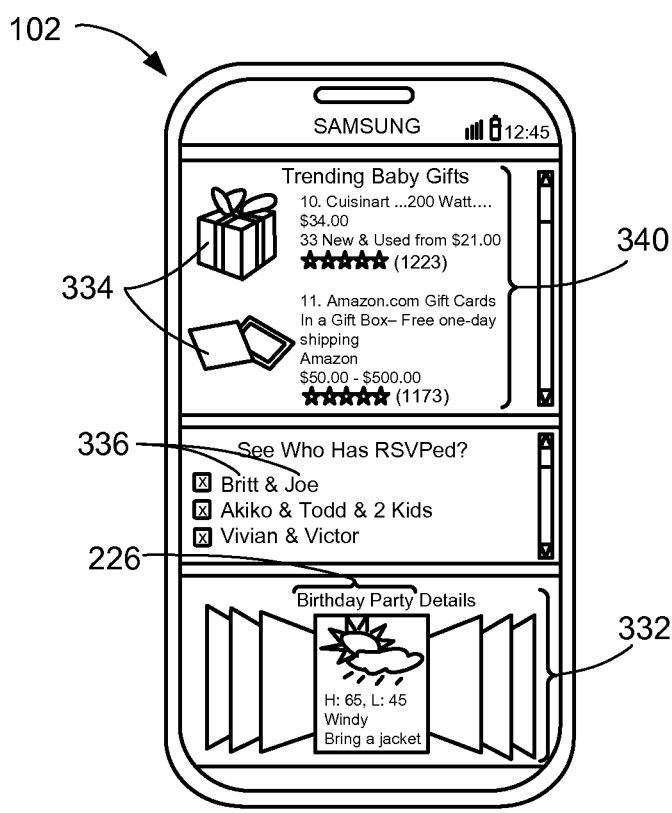
FIG. 5 is an exemplary display of the event details displayed on the first device.

Referring now to FIG. 5, therein is shown an exemplary display of the event details 332 displayed on the first device 102. FIG. 5 continues with the baby birthday example noted in the FIGS. 3 and 4. FIG. 5 depicts a user interface example on the first device 102 with three sections, as an example, including an upper portion, a middle portion, and a lower portion.

The upper portion of the display depicts the recommendations 340 for the item selections 334. The recommendations 340 can be based on a number of factors. For example, the recommendations 340 can factor information about the focal person 224 of FIG. 4. Here, the focal person 224 is a one-year old baby and the recommendations 340 can relate to what is appropriate for the focal person 224 of that age or the parents of the focal person 224.

Other information about the focal person 224 can be used as factors for generating the recommendations 340, such as the gender of the focal person 224, information about the parents of the focal person 224, and perhaps information about the invitees 336 of FIG. 3 for the upcoming event 226. The gender can influence the generation of the recommendations 340 for the item selections 334, such as color of clothes or the type of toys for the focal person 224. The information about the parents can influence the generation of the recommendations 340 based on past purchases so as to avoid unwanted duplicates or help determine if replenishment items should be purchased even for items already purchased by the parents. The information about the invitees 336 can influence the generation of the recommendations 340 if the invitees 336 have already purchased particular items or plans on purchasing particular items for the upcoming event 226 so as to avoid unnecessary duplicates. More about the generation of the recommendations 340 will be described later.

Returning to the upper portion, the recommendations 340 are shown ranked by trends for baby gifts, identifying information (such as names) about the gift, possible vendors for the gift, price range, and ratings. The trends can be based on some of the factors noted above or can be based on other factors, such as vendor rankings or proximity of the gift to a current location of the user 230 of FIG. 2 or to the focal person 224 or to the upcoming event 226.

The middle portion can display the event details 332 relating to the invitees 336. This portion can convey who among the invitees 336 plan to attend the upcoming event 226 and who has not yet decided as well as those who have declined to attend. Attendance or non-attendance of the invitees 336 can also be used as a factor to generate the recommendations 340 or to even adjust or modify the recommendations 340 based on the changes of attendance of the invitees 336.

The lower portion can display additional information about the event details 332. This portion can convey the location for the upcoming event 226. The event details 332 can also provide weather information, such as temperature and weather conditions, at the location for the upcoming event 226. The event details 332 for the weather information can be current information or future information near the time and date for the upcoming event 226. The event details 332 can include other information about the upcoming event 226, such as driving and parking direction, dressing code, event start time, event ending time, event specific details.

Figure 6:
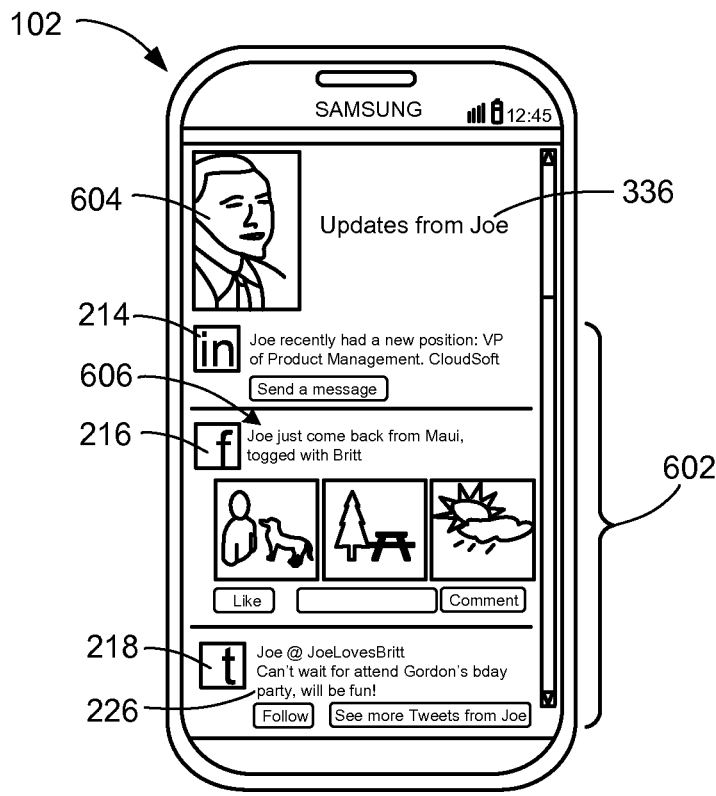
FIG. 6 is an exemplary display of aggregating an invitee's information displayed on the first device.

Referring now to FIG. 6, therein is shown an exemplary display of aggregating an invitee's information 602 displayed on the first device 102. Each of the invitees 336 might be identified by an invitee's identification 604. The invitee's identification 604 is a way to indicate who each of the invitees 336 are or a group of them. Examples of invitee's identification 604 can include their name, a picture, an icon, or an avatar. The invitee's information 602 is content or additional details about each of the invitees 336 or a group of them not related to mere identification.

In example depicted in FIG. 6, the computing system 100 utilized the invitees 336 or the invitee's identification 604 extracted from the event details 332 of FIG. 5 and gathered and aggregated the invitee's information 602 for one of the invitees 336, Joe or associated with the invitee's identification 604. The computing system 100 found Joe to be part of the professional network 214 of FIG. 2, the non-professional network 216 of FIG. 2, and the interest network 218 of FIG. 2. The computing system 100 can gather information from the social networks 208 of FIG. 2 and aggregate them for display. The computing system 100 can provide bullet points 606 from one or a number of information sources for the invitee's information 602. The bullet points 606 are recent or relevant information to the user 230 or for a particular social network.

The display can depict information as part of the bullet points 606 gathered from the professional network 214 including the invitee's identification 604 and the invitee's information 602 concerning his recent promotion. The display can also depict the invitee's information 602 about Joe's recent return from Maui from the non-professional network 216. The display can further depict the invitee's information 602 as comments by Joe regarding the upcoming event 226 gathered from the interest network 218.

Figure 7:
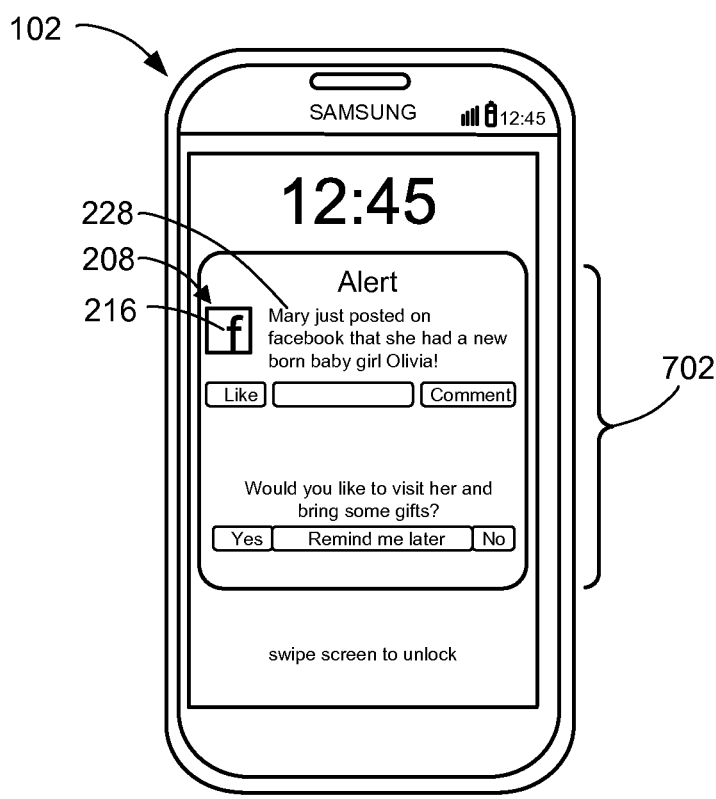
FIG. 7 is an exemplary display of monitoring the upcoming event displayed on the first device.

Referring now to FIG. 7, therein is shown an exemplary display of monitoring the upcoming event 226 displayed on the first device 102. FIG. 7 continues with the one-year old baby birthday party as the upcoming event 226. The computing system 100 can monitor information about the upcoming event 226 and the event details 332 extracted from the upcoming event 226.

In the example shown in FIG. 7, the computing system 100 monitors for general updates 702 from Mary as the event organizer 228 and the parent of the one-year old baby who is the focal person 224 for the upcoming event 226. The general updates 702 are information about the event details 332, the invitees 336, the focal person 224, the event organizer 228, or a combination thereof that are not related to the specifics of the upcoming event 226 and can be gathered from other sources. The other sources can be from the social networks 208 of FIG. 2.

In this example, the general updates 702 about Mary as the event organizer 228 is from the non-professional network 216 where Mary posts she had a new born baby girl. This information can be used as a factor to affect, adjust, or modify the recommendations 340 of FIG. 5 for the item selections 334 for the upcoming event 226 even though the new born is not the focal person 224, the one-year old baby, for the upcoming event 226.

Similarly, the computing system 100 can also monitor the invitee's information 602 of FIG. 6. As an example, the display on FIG. 6 can represent the general updates 702 for Joe who is one of the invitees 336 to the upcoming event 226. The computing system 100 can also monitor other types of the event details 332, such as change in weather, travel time, or attendance status for the invitees 336.

Figure 8:
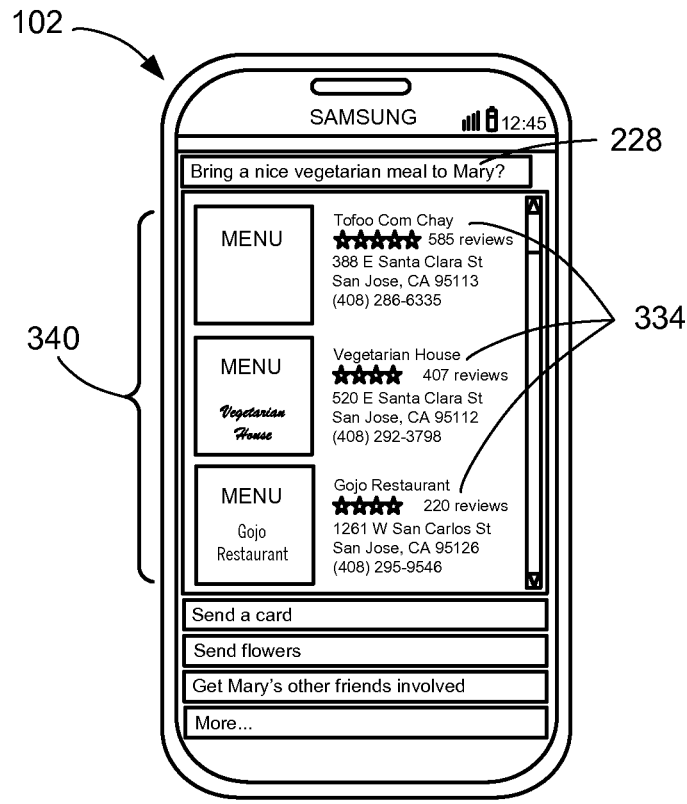
FIG. 8 is an exemplary display of the item selections displayed on the first device.

Referring now to FIG. 8, therein is shown an exemplary display of the item selections 334 displayed on the first device 102. In this example, FIG. 8 depicts the recommendations 340 similarly as described in FIG. 5 except the recommendations 340 for the item selections 334 is for Mary, the event organizer 228 for the upcoming event 226 of FIG. 4 of the baby birthday party, and not for the focal person 224, the one-year old baby, of the upcoming event 226.

The computing system 100 can provide the recommendations 340 for Mary based on the general updates 702 described in FIG. 7. As a general description, the computing system 100 can generate the recommendations 340 for the focal person 224, for the event organizer 228, for the invitees 336, or for other individuals connected by the computing system 100, which will be described in more detail later.

Figure 9:
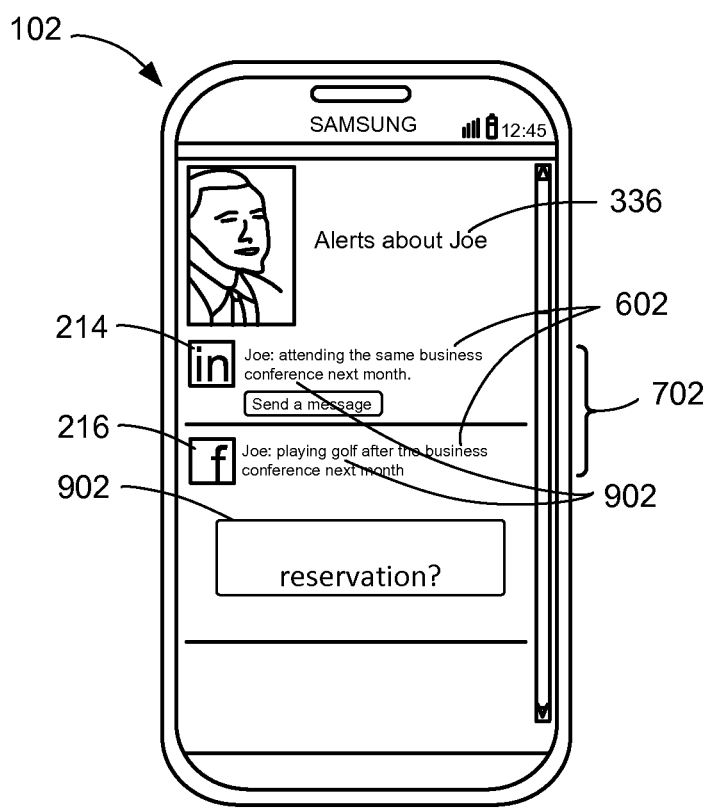
FIG. 9 is an exemplary display of monitoring one of the invitees displayed on the first device.

Referring now to FIG. 9, therein is shown an exemplary display of monitoring one of the invitees 336 displayed on the first device 102. In this example, the computing system 100 is monitoring one of the invitees 336, Joe, even if this is after or no longer related to the upcoming event 226 of FIG. 2 described in the previous figures. FIG. 9 depicts the general updates 702 for Joe gathered and aggregated from the professional network 214 and from the non-professional network 216.

FIG. 9 depicts a future interaction opportunity 902 for the user 230 of FIG. 2 of the computing system 100. The future interaction opportunity 902 is an event or location where one of the invitees 336 will be in the future and represents as possible intersection for the user 230 to interact with the particular person.

The invitee's information 602 gathered from the professional network 214 indicates that the future interaction opportunity 902 can be at a business conference next month where the user 230 will also be attending. FIG. 9 also depicts another instance of the future interaction opportunity 902 gathered from the non-professional network 216 where Joe will be playing golf after the business conference.

More generally, the computing system 100 can continue to monitor the invitees 336, the focal person 224, the event organizer 228, or other individuals beyond and no longer related to the upcoming event 226 discussed earlier. More information about the monitoring function is described later.

Figure 10:
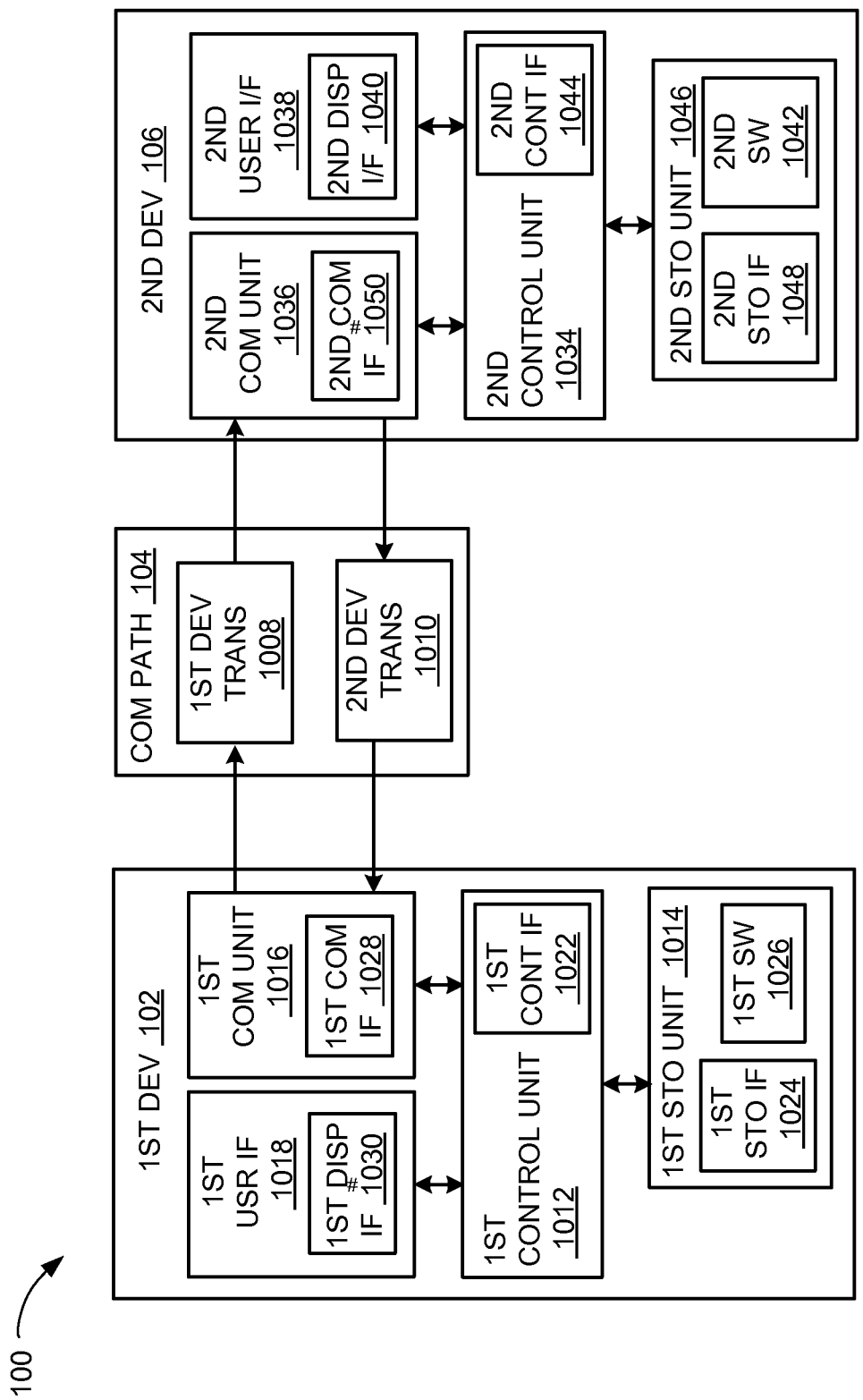
FIG. 10 is an exemplary block diagram of the computing system.

Referring now to FIG. 10, therein is shown an exemplary block diagram of the computing system 100. The computing system 100 can include the first device 102, the communication path 104, and the second device 106. The first device 102 can send information in a first device transmission 1008 over the communication path 104 to the second device 106. The second device 106 can send information in a second device transmission 1010 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 1012, a first storage unit 1014, a first communication unit 1016, and a first user interface 1018. The first control unit 1012 can include a first control interface 1022. The first control unit 1012 can execute a first software 1026 to provide the intelligence of the computing system 100.

The first control unit 1012 can be implemented in a number of different manners. For example, the first control unit 1012 can be a processor, an application specific integrated circuit (ASIC) an embedded processor, a microprocessor, a hardware control logic, a hardware finite state machine (FSM), a digital signal processor (DSP), or a combination thereof. The first control interface 1022 can be used for communication between the first control unit 1012 and other functional units in the first device 102. The first control interface 1022 can also be used for communication that is external to the first device 102.

The first control interface 1022 can receive information from the other functional units or from external sources, or can transmit information to the other functional units or to external destinations. The external sources and the external destinations refer to sources and destinations external to the first device 102.

The first control interface 1022 can be implemented in different ways and can include different implementations depending on which functional units or external units are being interfaced with the first control interface 1022. For example, the first control interface 1022 can be implemented with a pressure sensor, an inertial sensor, a microelectromechanical system (MEMS), optical circuitry, waveguides, wireless circuitry, wireline circuitry, or a combination thereof.

The first storage unit 1014 can store the first software 1026. The first storage unit 1014 can also store the relevant information, such as data representing incoming images, data representing previously presented image, sound files, or a combination thereof.

The first storage unit 1014 can be a volatile memory, a nonvolatile memory, an internal memory, an external memory, or a combination thereof. For example, the first storage unit 1014 can be a nonvolatile storage such as non-volatile random access memory (NVRAM), Flash memory, disk storage, or a volatile storage such as static random access memory (SRAM).

The first storage unit 1014 can include a first storage interface 1024. The first storage interface 1024 can be used for communication between and other functional units in the first device 102. The first storage interface 1024 can also be used for communication that is external to the first device 102.

The first storage interface 1024 can receive information from the other functional units or from external sources, or can transmit information to the other functional units or to external destinations. The external sources and the external destinations refer to sources and destinations external to the first device 102.

The first storage interface 1024 can include different implementations depending on which functional units or external units are being interfaced with the first storage unit 1014. The first storage interface 1024 can be implemented with technologies and techniques similar to the implementation of the first control interface 1022.

The first communication unit 1016 can enable external communication to and from the first device 102. For example, the first communication unit 1016 can permit the first device 102 to communicate with the second device 106 of FIG. 1, an attachment, such as a peripheral device or a computer desktop, and the communication path 104.

The first communication unit 1016 can also function as a communication hub allowing the first device 102 to function as part of the communication path 104 and not limited to be an end point or terminal unit to the communication path 104. The first communication unit 1016 can include active and passive components, such as microelectronics or an antenna, for interaction with the communication path 104.

The first communication unit 1016 can include a first communication interface 1028. The first communication interface 1028 can be used for communication between the first communication unit 1016 and other functional units in the first device 102. The first communication interface 1028 can receive information from the other functional units or can transmit information to the other functional units.

The first communication interface 1028 can include different implementations depending on which functional units are being interfaced with the first communication unit 1016. The first communication interface 1028 can be implemented with technologies and techniques similar to the implementation of the first control interface 1022.

The first user interface 1018 allows a user (not shown) to interface and interact with the first device 102. The first user interface 1018 can include an input device and an output device. Examples of the input device of the first user interface 1018 can include a keypad, a touchpad, soft-keys, a keyboard, a microphone, an infrared sensor for receiving remote signals, or any combination thereof to provide data and communication inputs.

The first user interface 1018 can include a first display interface 1030. The first display interface 1030 can include a display, a projector, a video screen, a speaker, or any combination thereof.

The first control unit 1012 can operate the first user interface 1018 to display information generated by the computing system 100. The first control unit 1012 can also execute the first software 1026 for the other functions of the computing system 100. The first control unit 1012 can further execute the first software 1026 for interaction with the communication path 104 via the first communication unit 1016.

The second device 106 can be optimized for implementing an embodiment of the present invention in a multiple device embodiment with the first device 102. The second device 106 can provide the additional or higher performance processing power compared to the first device 102. The second device 106 can include a second control unit 1034, a second communication unit 1036, and a second user interface 1038.

The second user interface 1038 allows a user (not shown) to interface and interact with the second device 106. The second user interface 1038 can include an input device and an output device. Examples of the input device of the second user interface 1038 can include a keypad, a touchpad, soft-keys, a keyboard, a microphone, or any combination thereof to provide data and communication inputs. Examples of the output device of the second user interface 1038 can include a second display interface 1040. The second display interface 1040 can include a display, a projector, a video screen, a speaker, or any combination thereof.

The second control unit 1034 can execute a second software 1042 to provide the intelligence of the second device 106 of the computing system 100. The second software 1042 can operate in conjunction with the first software 1026. The second control unit 1034 can provide additional performance compared to the first control unit 1012.

The second control unit 1034 can operate the second user interface 1038 to display information. The second control unit 1034 can also execute the second software 1042 for the other functions of the computing system 100, including operating the second communication unit 1036 to communicate with the first device 102 over the communication path 104.

The second control unit 1034 can be implemented in a number of different manners. For example, the second control unit 1034 can be a processor, an embedded processor, a microprocessor, hardware control logic, a hardware finite state machine (FSM), a digital signal processor (DSP), or a combination thereof.

The second control unit 1034 can include a second controller interface 1044. The second controller interface 1044 can be used for communication between the second control unit 1034 and other functional units in the second device 106. The second controller interface 1044 can also be used for communication that is external to the second device 106.

The second controller interface 1044 can receive information from the other functional units or from external sources, or can transmit information to the other functional units or to external destinations. The external sources and the external destinations refer to sources and destinations external to the second device 106.

The second controller interface 1044 can be implemented in different ways and can include different implementations depending on which functional units or external units are being interfaced with the second controller interface 1044. For example, the second controller interface 1044 can be implemented with a pressure sensor, an inertial sensor, a microelectromechanical system (MEMS), optical circuitry, waveguides, wireless circuitry, wireline circuitry, or a combination thereof.

A second storage unit 1046 can store the second software 1042. The second storage unit 1046 can also store the such as data representing incoming images, data representing previously presented image, sound files, or a combination thereof. The second storage unit 1046 can be sized to provide the additional storage capacity to supplement the first storage unit 1014.

For illustrative purposes, the second storage unit 1046 is shown as a single element, although it is understood that the second storage unit 1046 can be a distribution of storage elements. Also for illustrative purposes, the computing system 100 is shown with the second storage unit 1046 as a single hierarchy storage system, although it is understood that the computing system 100 can have the second storage unit 1046 in a different configuration. For example, the second storage unit 1046 can be formed with different storage technologies forming a memory hierarchal system including different levels of caching, main memory, rotating media, or off-line storage.

The second storage unit 1046 can be a volatile memory, a nonvolatile memory, an internal memory, an external memory, or a combination thereof. For example, the second storage unit 1046 can be a nonvolatile storage such as non-volatile random access memory (NVRAM), Flash memory, disk storage, or a volatile storage such as static random access memory (SRAM).

The second storage unit 1046 can include a second storage interface 1048. The second storage interface 1048 can be used for communication between other functional units in the second device 106. The second storage interface 1048 can also be used for communication that is external to the second device 106.

The second storage interface 1048 can receive information from the other functional units or from external sources, or can transmit information to the other functional units or to external destinations. The external sources and the external destinations refer to sources and destinations external to the second device 106.

The second storage interface 1048 can include different implementations depending on which functional units or external units are being interfaced with the second storage unit 1046. The second storage interface 1048 can be implemented with technologies and techniques similar to the implementation of the second controller interface 1044.

The second communication unit 1036 can enable external communication to and from the second device 106. For example, the second communication unit 1036 can permit the second device 106 to communicate with the first device 102 over the communication path 104.

The second communication unit 1036 can also function as a communication hub allowing the second device 106 to function as part of the communication path 104 and not limited to be an end point or terminal unit to the communication path 104. The second communication unit 1036 can include active and passive components, such as microelectronics or an antenna, for interaction with the communication path 104.

The second communication unit 1036 can include a second communication interface 1050. The second communication interface 1050 can be used for communication between the second communication unit 1036 and other functional units in the second device 106. The second communication interface 1050 can receive information from the other functional units or can transmit information to the other functional units.

The second communication interface 1050 can include different implementations depending on which functional units are being interfaced with the second communication unit 1036. The second communication interface 1050 can be implemented with technologies and techniques similar to the implementation of the second controller interface 1044.

The first communication unit 1016 can couple with the communication path 104 to send information to the second device 106 in the first device transmission 1008. The second device 106 can receive information in the second communication unit 1036 from the first device transmission 1008 of the communication path 104.

The second communication unit 1036 can couple with the communication path 104 to send information to the first device 102 in the second device transmission 1010. The first device 102 can receive information in the first communication unit 1016 from the second device transmission 1010 of the communication path 104. The computing system 100 can be executed by the first control unit 1012, the second control unit 1034, or a combination thereof. For illustrative purposes, the second device 106 is shown with the partition having the second user interface 1038, the second storage unit 1046, the second control unit 1034, and the second communication unit 1036, although it is understood that the second device 106 can have a different partition. For example, the second software 1042 can be partitioned differently such that some or all of its function can be in the second control unit 1034 and the second communication unit 1036. Also, the second device 106 can include other functional units not shown in FIG. 10 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 11:
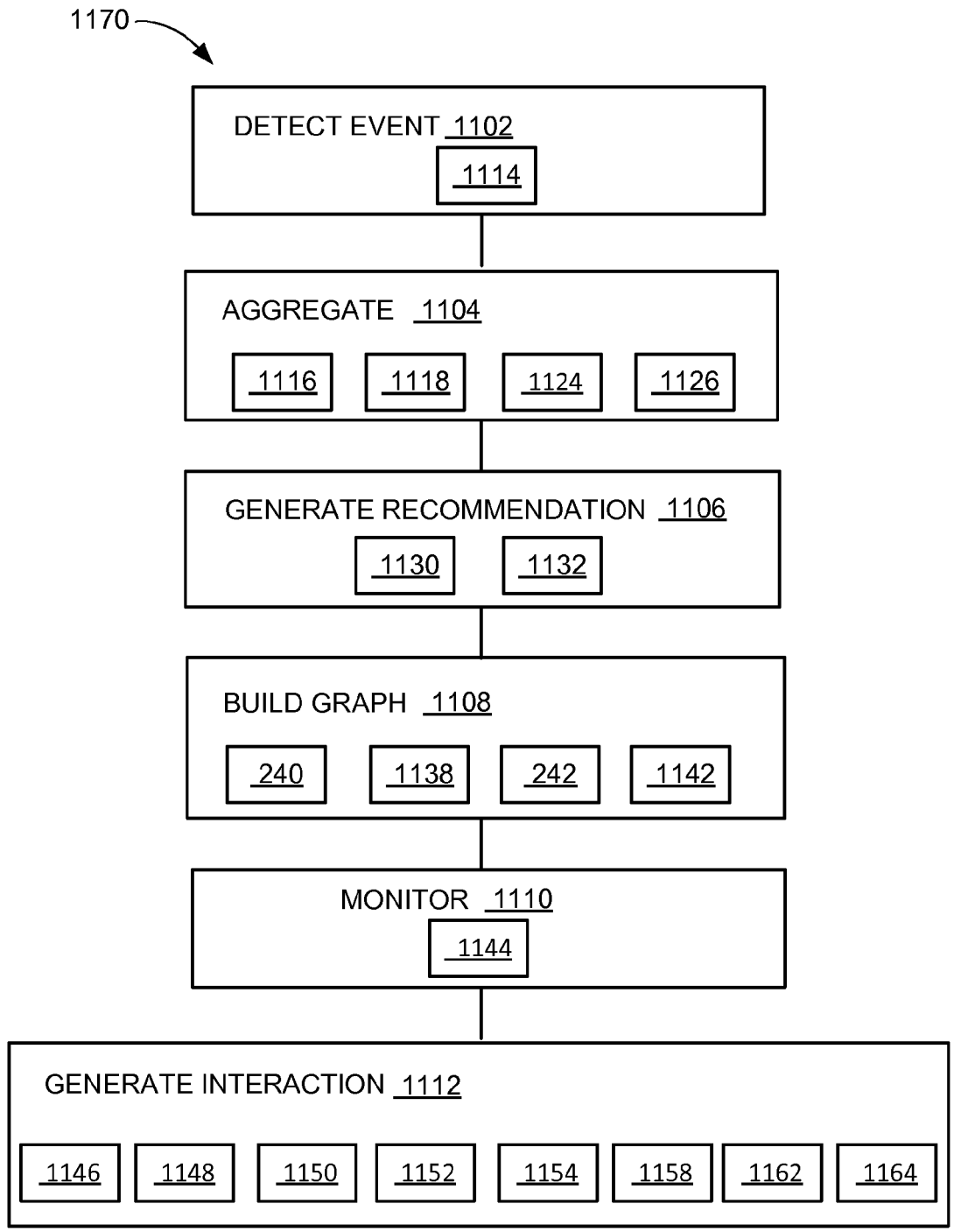
FIG. 11 is a control flow of the computing system.

Referring now to FIG. 11, therein is shown a control flow of the computing system 100. The computing system 100 can include a detect event module 1102, an aggregate module 1104, a generate recommendation module 1106, a build graph module 1108, a monitor module 1110, and a generate interaction module 1112. As an example, the modules are coupled to each other and the control flow can progress from one module to the next sequentially order numbered module. The sequential order is shown for brevity and illustrative clarity and is not limited to a unidirectional flow nor limited not necessarily limited to a single execution.

The detect event module 1102 detects an upcoming event for the user 230 of FIG. 2 of the computing system 100. The detection can occur in a number of ways. For example, the detect event module 1102 can detect the upcoming event 226 of FIG. 2 at the time the user 230 receives an initial invitation 1114, such as an Outlook™ invitation, an electronic invitation as Evite™, or other forms of invitation. Examples of other forms of invitation can be through text messages, messages or invitation through the social networks 208 of FIG. 2. The initial invitation 1114 is the initial notification of an event to the user 230.

The detect event module 1102 can also detect the upcoming event 226 from other sources where the event has already been sent to the user 230. As examples, the detect event module 1102 can scan a calendar the user 230 keeps to track appointments. Examples of the calendar are an Outlook™ calendar, an on-line calendar, a calendar on a mobile device, or a combination thereof.

Regardless of when the detect event module 1102 detects the event, the event is then processed by the computing system 100 as the upcoming event 226 of FIG. 2. The detect event module 1102 can also detect changes to the upcoming event 226 by monitoring the sources as described above. The computing system 100 can also operate the monitor module 1110 with the detect event module 1102 to track changes with the upcoming event 226. The monitor module 1110 will be described in more detail later.

Regarding the aggregate module 1104, this module aggregates information relating to the upcoming event 226. The aggregate module 1104 can gather supplemental information 1116 by starting with the event details 332 of FIG. 3. The aggregate module 1104 can generate the bullet points 606 of FIG. 6 from the supplemental information 1116, which can include the invitee's information 602 of FIG. 6. The aggregate module 1104 can gather the supplemental information 1116 in a number of ways.

For example, the aggregate module 1104 can scan the information contained in the event invitation itself. The aggregate module 1104 can search the initial invitation 1114 for the purpose of the invitation, such as a birthday party, the focal person 224 of FIG. 4, such as the one-year old baby, the invitees 336 of FIG. 4 to the upcoming event 226, the event organizer 228 of FIG. 2, the location of the upcoming event 226, and the time and date of the upcoming event 226. The aggregate module 1104 can extract the identities of these individuals from the event details 332 from the initial invitation 1114 for the upcoming event 226. Some of these identities can be the invitee's identification 604 of FIG. 6 for each of the invitees 336 of FIG. 3. The aggregate module 1104 can also identify one of the invitees 336, such as Joe in FIG. 5, as a contact that the user 230 would like to interact at the upcoming event 226 or some other time or location. The aggregate module 1104 can utilize natural language processing to extract and gather the information noted above. The natural language processing or text or information mining techniques can be employed to gather the information from any number of formats, such as from an electronic mail, an electronic invitation, an invitation from a calendar application, from a text message, from a Tweet, as examples.

The aggregate module 1104 can also continue to gather the supplemental information 1116 by searching a change notification 1118 for the upcoming event 226 by scanning the change notification 1118 as a new invitation or search for just the changes from the initial invitation 1114. The change notification 1118 is an update to the initial invitation 1114. The change notification 1118 can include the event updates 338 of FIG. 3. The aggregate module 1104 can operate with the change notification 1118 for an update to the initial invitation 1114 for the upcoming event 226.

Examples of the change notification 1118 can include change to time, location, date, list of the invitees 336, attendance of the invitees 336, or even a complete cancellation of the upcoming event 226. Other examples for the change notification 1118 can include additional information not previously provided or deleted information that was previously provided. The change notification 1118 can be based on modifications to the initial invitation 1114 or another instance of the change notification 1118 that was earlier transmitted.

The aggregate module 1104 can utilize the supplemental information 1116 gather from above to search other sources relating to the upcoming event 226. For example, the aggregate module 1104 can process the event details 332 from the initial invitation 1114 or the change notification 1118 to search other sources for the supplemental information 1116. The aggregate module 1104 can search the social networks 208, as an example, for the supplemental information 1116 initially derived from the upcoming event 226 or the event details 332.

As a more specific example, the aggregate module 1104 can search the social networks 208 for information about a search target 1122. The search target 1122 is the individual, item, or entity as the subject of a search. Examples of the search target 1122 from the one-year old birthday party example are the focal person 224, the event organizer 228, or the invitees 336. As a more specific example, the search target 1122 can be Joe as one of the invitees 336 for the upcoming event 226 shown in FIG. 5.

A target privacy setting 1124 can limit how much information about the search target 1122 is accessible to the aggregate module 1104 from the social networks 208 where the search target 1122 is a member. The target privacy setting 1124 can be set by the information owner or the entity of which the information relates. The target privacy setting 1124 can be set by entities hosting the social networks 208. The target privacy setting 1124 controls how much information regarding the search target 1122 is available to others, how much control is provided to others, or a combination thereof. The target privacy setting 1124 can be based on the relationship between the search target 1122 and the user 230, in this example is performing the search utilizing the aggregate module 1104. This relationship can determine how much information about the search target 1122 is viewable. The target privacy setting 1124 can also provide a binary control, such as all public and all private, depending on an authorized viewer or not.

Depending on the type or purpose of the upcoming event 226, the aggregate module 1104 can prioritize the network types 212 of FIG. 2 to search. For the example with the one-year old baby birthday party, the aggregate module 1104 can prioritize the non-professional network 216 of FIG. 2, the interest network 218 of FIG. 2, or a combination thereof over the professional network 214 of FIG. 2 if the search is for the focal person 224 as the one-year old baby or for the event organizer 228 as the parents of the baby relating to the upcoming event 226. As a different example, the aggregate module 1104 can prioritize the professional network 214 for searching more professional information about one of the invitees 336, such as Joe discussed in FIG. 6 and FIG. 9.

The aggregate module 1104 can search for the supplemental information 1116 in a predetermined order 1126 instead of a particular priority as described above. The predetermined order 1126 is a search sequence fixed by the computing system 100 regardless of the specifics of the event details 332. The predetermined order 1126 can be established by the user 230 of the computing system 100 manually or automatically by the aggregate module 1104. For example, the aggregate module 1104 can determine the social networks 208 or the network types 212 the user 230 is associated with or is a member. The aggregate module 1104 can default prioritize these memberships by the user 230. The aggregate module 1104 can also search information available on the first device 102 of FIG. 1 belonging to the user 230.

If the target privacy setting 1124 inhibits or limits the aggregate module 1104 from gathering the supplemental information 1116 from the instance of the social graphs 210 for the search target 1122, then the aggregate module 1104 can search the social graphs 210 of other people where the search target 1122 is visible. Visibility is an identification of the search target 1122. The identification can be by a name, a picture, an audio clip, an avatar, a slogan, or a saying, as examples. Visibility can vary depending on the network types 212. Visibility can be as a friend of someone in the non-professional network 216. Visibility can be opinions, comments, or statements based on messages posted by the search target 1122 on the interest network 218. Visibility can be a professional contact for another person in the professional network 214.

The aggregate module 1104 can search for the supplemental information 1116 based on the purpose of the upcoming event 226. Continuing with the one-year old baby birthday party, the aggregate module 1104 can search for gifts or toys appropriate for the supplemental information 1116 for a one-year baby who is the focal person 224. The aggregate module 1104 can also identify that the condition or the age of the focal person 224 and seek to search about the parents, grandparents, uncles or aunts, or old siblings to determine what have been purchased in the past for the baby. The aggregate module 1104 can search various sources for information about these individuals including the social networks 208 where they are a member.

The aggregate module 1104 can generate the bullet points 606 from the supplemental information 1116 based on the purpose of the upcoming event 226. The aggregate module 1104 can generate the bullet points 606 for the future interaction opportunity 902 of FIG. 9. In the examples from FIGS. 6 and 9, one of the invitees 336, Joe, can be a professional contact for the user 230 and the aggregate module 1104 can filter the supplemental information 1116 relating to a professional or sourced from professional sources and the professional network 214 is an example. The aggregate module 1104 can utilize the information from this filtering process and perform additional filtering in different context that can relate to the professional context. In the example in FIG. 9, the aggregate module 1104 can identify the golfing activity as the future interaction opportunity 902 based on the aggregate module 1104 identifying the business conference from the professional context search.

Regarding the generate recommendation module 1106, this module generates the recommendations 340 of FIG. 3 for the upcoming event 226. The recommendations 340 can be generated in a number of ways.

For example, the generate recommendation module 1106 can analyze the supplemental information 1116 relating to the purpose of the upcoming event 226 and identify the item selections 334 of FIG. 3 appropriate for the upcoming event 226. Using the example of the one-year baby birthday party, the generate recommendation module 1106 can search items appropriate for the focal person 224 who is one-year of age. The generate recommendation module 1106 can search for items appropriate for the event organizer 228 since the parents are the ones taking care of the baby.

The generate recommendation module 1106 can search for items already purchased for the focal person 224 by the event organizer 228 or other folks, such as grandparents, siblings, uncles, aunts, or other relatives and friends. The generate recommendation module 1106 can filter what should be recommended as the item selections 334 of FIG. 5 even for items already purchased. As an example, the generate recommendation module 1106 can filter out past purchased items from being included in the recommendations 340 where duplicates of these items are not typical or wanted, such as a baby crib or new born clothing. The generate recommendation module 1106 can filter past purchased items to be included in the recommendations 340 where duplicates of these items are typically desired or wanted, such as diapers or baby food.

The generate recommendation module 1106 can prioritize or filter which of the item selections 334 should be presented as part of the recommendations 340 or the order to be presented. For example, ratings for the particular item from the item selections 334 can determine the order where that particular item is located in the recommendations 340, as shown in FIG. 5 and FIG. 8.

The generate recommendation module 1106 can also filter or prioritize the item selections 334 in the recommendations 340 based on projected future conditions 1130. The projected future conditions 1130 are environmental or attendant circumstances related to the upcoming event 226. Using the example of the one-year old baby birthday party, if the party is during summer and the upcoming fall or winter season can be especially cold, the items appropriate for the projected future conditions 1130 for a cooling fall to a cold winter can be presented higher as one of the item selections 334 for the recommendations 340.

The generate recommendation module 1106 can determine the projected future conditions 1130 in a number of ways. The generate recommendation module 1106 can extract the purpose of the upcoming event 226 and can identify possibilities for the projected future conditions 1130 based on the purpose. In the example discussed above, the generate recommendation module 1106 determined the focal person 224 is a growing baby with the upcoming event 226 as a birthday party at a seasonal time of summer. The generate recommendation module 1106 can factor a current stage 1132 about the focal person 224, such as a growing baby at that age range rapidly outgrows clothing. The current stage 1132 is information about a present condition about the subject of concern. As such, the generate recommendation module 1106 can include within the recommendations 340 the item selections 334 for new clothing for the upcoming seasons.

The generate recommendation module 1106 can also utilize the projected future conditions 1130 to eliminate or filter out particular items from the recommendations 340. Again, using the example of the one-year baby birthday party, the generate recommendation module 1106 can determine that the date of the upcoming event 226 is towards the end of summer and can eliminate summer clothing, especially factoring the current stage 1132 of the focal person 224, such as a baby of that age will continue to grow rapidly and new summer clothing will not likely fit the following summer.

The generate recommendation module 1106 can also modify the recommendations 340 based on the general updates 702 of FIG. 7 relating to information derived from the event details 332 of the upcoming event 226. In the example in FIG. 7, Mary is the mother of the focal person 224 and the event organizer 228 for the upcoming event 226. Because the purpose of the upcoming event 226 is a one-year old baby birthday party, it is likely that the focal person 224 will not fully appreciate the upcoming event 226 due to the current stage 1132 of being one-year old. The generate recommendation module 1106 can modify the recommendations 340 to include gift for the new born baby as well as for the focal person 224, change the priority or order of the recommendations 340, or add or modify the order to include the item selections 334 that can be useful for both the new born baby and the focal person 224.

Continuing with the example from FIG. 7 and adding the example in FIG. 8, the generate recommendation module 1106 can also provide the recommendations 340 for the event organizer 228 or Mary. FIG. 8 depicts the item selections 334 for the recommendations 340 based on the fact that Mary now has two young babies to take care and could appreciate treating herself, even though it is not directly related to the purpose of the upcoming event 226.

Regarding the build graph module 1108, this module builds the enhanced graph 240 for the computing system 100, or modifies or extends an existing social graph. The build graph module 1108 can utilize the supplemental information 1116, including the invitee's information 602 or the invitee's identification 604, gathered initially from the event details 332 to build or to extend based on the target privacy setting 1124.

The enhanced graph 240 is a new social graph generated from the supplemental information 1116, the professional network 214, the non-professional network 216, the interest network 218, or a combination thereof. The build graph module 1108 can build the enhanced graph 240 if, for example, the target privacy setting 1124 does not provide control or limits access to the one or more the social networks 208 where the search target 1122 is a member. The build graph module 1108 can build the enhanced graph 240 if, for example, the user 230 has a user's privacy setting 1138 to restrict access or control to the instance of the social graphs 210 where the user 230 is a member. The user's privacy setting 1138 controls how much information regarding the user 230, the enhanced graph 240, or a combination thereof is available to others, how much control is provided to others, or a combination thereof.

The user's privacy setting 1138 can be under the control of the company hosting the social networks 208 where the user 230 is a member. In this example, the build graph module 1108 can be inhibited or limited to add to the social graphs 210 where the user 230 is a member.

The build graph module 1108 can generate the extension graph 242 to add or modify an existing social graphs. The extension graph 242 is also a social graph as an addition or modification to an existing social graph utilizing the supplemental information 1116. The build graph module 1108 can add the extension graph 242 to the social graphs 210 where the search target 1122 is a member as long as the target privacy setting 1124 permits this level of control. The build graph module 1108 can add the extension graph 242 to the social graphs 210 where the user 230 is a member as long as the user's privacy setting 1138 permits this addition.

The build graph module 1108 can generate a combination of the enhanced graph 240 as well as the extension graph 242 depending on the various settings of the target privacy setting 1124 and the user's privacy setting 1138 for each of the social graphs 210 for the search target 1122, the user 230, or a combination thereof. The build graph module 1108 can also generate the extension graph 242 to a previously generated instance of the enhanced graph 240.

The build graph module 1108 can generate the topology of the enhanced graph 240, the extension graph 242, or a combination thereof with specific information from the supplemental information 1116 located with a degree of separation 1142 from the user 230, the search target 1122, or a combination thereof. The degree of separation 1142 is a measure of closeness within a social graph. An example of the degree of separation 1142 is a number of edges between nodes in a social graph. A node is a person, item, or entity in the social graph. An edge is the connection between two nodes in the social graph. The greater the degree of separation 1142, the more remote the nodes are to each other or the closeness is less.

Using the example of the one-year old baby birthday party, the build graph module 1108 can identify one of the invitees 336, as the search target 1122 in the supplemental information 1116, including the invitee's identification 604, derived from the event details 332 for the upcoming event 226, as a new contact for the invitee's information 602. As a new contact, the build graph module 1108 can place this person with the degree of separation 1142 in the enhanced graph 240 or the extension graph 242 reflecting the newness of this contact or the closeness is far from the user 230. In other words, the degree of separation 1142 between the user 230 and the search target 1122 is higher compared to the user 230 and a longtime friend to the user 230. As a variation example, if one of the invitees 336 is not a new contact but a distant acquaintance, then the build graph module 1108 can place this person with the degree of separation 1142 from the user 230 between a new contact and the longtime friend as part of the invitee's information 602 based on the invitee's identification 604.

The build graph module 1108 can operate with the generate interaction module 1112 to modify, add to, or create a new instance in the enhanced graph 240, the extension graph 242, the social graphs 210, or a combination thereof. As an example, as the interaction increases between the user 230 and the search target 1122, then the degree of separation 1142 can decrease. Conversely, the lack of interaction or the time between interactions can also increase the degree of separation 1142. More about the operation between the build graph module 1108 and the generate interaction module 1112 is described later.

Returning to the monitor module 1110, this module can track information relating to the upcoming event 226 or information derived from the event details 332 for the upcoming event 226. As described above, the monitor module 1110 can utilize the supplemental information 1116 gathered from the initial invitation 1114 for the purpose of preparation to attend the upcoming event 226.

The monitor module 1110 can also utilize the supplemental information 1116 gathered from the change notification 1118 and the other sources to provide information for the aggregate module 1104, the generate recommendation module 1106, and the build graph module 1108, or a combination thereof. The monitor module 1110 can track information in the enhanced graph 240 or the social graphs 210 with the extension graph 242 for generating interactions, which is described later.

The monitor module 1110 can track changes within the supplemental information 1116 and feed updates to the aggregate module 1104 to update the information that gathered in the supplemental information 1116. The updates to the supplemental information 1116 can be modifications to existing information included within the supplemental information 1116 or can be new information to be added to the supplemental information 1116.

Using the example of the one-year old birthday party, the monitor module 1110 can monitor the invitees 336 in the supplemental information 1116 gathered from the event details 332. As in the example described in FIG. 9, the monitor module 1110 can track the general updates 702 for one of the invitees 336, such as Joe, for the upcoming event 226. The general updates 702 can be recent information relating to the search target 1122. The general updates 702 can represent updates posted by Joe utilizing the professional network 214, the non-professional network 216, the interest network 218, other communication platforms, or a combination thereof.

If a new person is added as one of the invitees 336, such as the baby's pedestrian, then the aggregate module 1104 can search for information relating to the pediatrician. Further, if the aggregate module 1104 identifies the pediatrician often brings baby health care products, such as a skin thermometer, then that can be removed or deprioritized in the recommendations 340 for the item selections 334 by the generate recommendation module 1106. If the pediatrician is a new contact for the user 230, then the build graph module 1108 can generate the enhanced graph 240 or the extension graph 242 utilizing new information about the pediatrician in the supplemental information 1116.

Using a different scenario, if the invitees 336, such as the grandparents, are no longer planning to attend the upcoming event 226 of the birthday party, then the monitor module 1110 operate with the aggregate module 1104 to identify what types of gifts as they tend to bring and if those types of gifts are not included in the supplemental information 1116 or even if it was already included can prompt a refresh of that information to be gathered for the supplemental information 1116. The generate recommendation module 1106 can utilize the updates in the supplemental information 1116 and the fact the grandparents will not be able to attend will perhaps change the priority for the item selections 334 in the recommendations 340 being generated or updated.

The monitor module 1110 can track information in the social graphs 210 whether the enhanced graph 240 or the social graphs 210 with the extension graph 242. The monitor module 1110 tracks these information not for the purpose of the upcoming event 226 but can be for the supplemental information 1116 originally derived from event details 332 from the upcoming event 226. As noted above, the monitor module 1110 can operate with the generate interaction module 1112 to generate a future interaction opportunity 902 between the user 230 and another person that can be originally identified as one of the invitees 336 from the event details 332 for the upcoming event 226.

The monitor module 1110 can utilize commonalities from the supplemental information 1116 to identify a common interest 1144 between the user 230 and the search target 1122. The common interest 1144 is a person, an item, a location, or an activity that overlaps the user 230 and the search target 1122. The common interest 1144 can be utilized for generating the future interaction opportunity 902.

The common interest 1144 can be identified by a number of ways. For example, monitor module 1110 can identify the common interest 1144 based on the number of times an attribute in the supplemental information 1116 about the search target 1122 matches with the user 230. Examples of attributes can be an activity, location, preferences, objects, or people. Other examples of attributes can be based on age, likes or dislikes, or similar or overlapping associations with friends, co-workers, or neighbors.

Returning to the generate interaction module 1112, this module utilizes the supplemental information 1116, the enhanced graph 240, the existing instances of the social graphs 210 having the extension graph 242, or a combination thereof to identify a future interaction opportunity 902 with the search target 1122. The generate interaction module 1112 also generates an initial interaction request 1146 for the future interaction opportunity 902. The generate interaction module 1112 also generates a detailed interaction request 1148, when appropriate.

The initial interaction request 1146 is an interaction request from the user 230 to the search target 1122. The generate interaction module 1112 can operate with the monitor module 1110 to help identify the future interaction opportunity 902 with the search target 1122. Using the one-year old baby birthday party example, the search target 1122 is one of the invitees 336, such as Joe, originally derived from the event details 332 of the upcoming event 226 of the baby birthday party.

As noted above, the future interaction opportunity 902 is an opportunity for the user 230 to contact one or more of the invitees 336, the event organizer 228, the focal person 224, or other individuals or entities from the supplemental information 1116 derived from the event details 332 for the upcoming event 226. The future interaction opportunity 902 can vary relative to the timing of the upcoming event 226. The future interaction opportunity 902 can be before, during, or after the upcoming event 226.

The information details in the initial interaction request 1146 can vary depending on a number of factors. Examples of the factors include the degree of separation 1142 between the user 230 and the search target 1122 in the enhanced graph 240 or the social graphs 210 appended with the extension graph 242. Another factor is whether the search target 1122 is a new contact or an acquaintance with whom the user 230 has not had an interaction for some time. A further factor can be the amount of common contacts known to both the user 230 and the search target 1122 as a new contact. Yet further examples are the target privacy setting 1124 and the user's privacy setting 1138.

For example, if the target privacy setting 1124 limits access to the information or contact with the search target 1122, the initial interaction request 1146 can include minimal information 1150 as well as reminder information 1152. The minimal information 1150 is an alert identifying the user 230 and a brief note 1154. The brief note 1154 includes information about a possibility for the future interaction opportunity 902 without the specifics of location, date, time, or a combination thereof. The reminder information 1152 is a note about the relationship between the user 230 and the search target 1122.

Using the examples from FIG. 4, FIG. 6, and FIG. 9, the monitor module 1110 can provide the general updates 702 with the future interaction opportunity 902 for one of the invitees 336, Joe, as the search target 1122. The monitor module 1110 is shown providing the future interaction opportunity 902 at a business conference gathered by the aggregate module 1104 from the professional network 214, the extension graph 242 appended to the professional network 214, or a combination thereof. The monitor module 1110 is also shown providing the future interaction opportunity 902 at a golf course, as perhaps the common interest 1144, following the business conference gathered by the aggregate module 1104 from the non-professional network 216.

The generate interaction module 1112 can form the initial interaction request 1146 to include the minimal information 1150 for identifying the user 230 and the reminder information 1152 regarding the upcoming event 226, whether past, present, or yet to occur, relative to sending of the initial interaction request 1146. This set of information in the initial interaction request 1146 can be based on the target privacy setting 1124 limiting contact to the search target 1122. This set of information can also be based on the degree of separation 1142 between the user 230 and the search target 1122 who is closer to being a new contact than a close friend in the enhanced graph 240 or with the professional network 214 appended with the extension graph 242 or with the non-professional network 216 appended with the extension graph 242.

The generate interaction module 1112 can time the initial interaction request 1146 based on a number of factors. For example, the initial interaction request 1146 can be generated based on the timing of the upcoming event 226 where the search target 1122 was originally derived, the timing of the future interaction opportunity 902, and a likelihood of a positive response to the initial interaction request 1146 from the search target 1122.

As an example of timing, if the degree of separation 1142 between the user 230 and the search target 1122 is one of a new contact, the search target 1122 can be disinclined to agree to meet the user 230 as a possible stranger despite the commonality of the upcoming event 226. In this example, if the future interaction opportunity 902 for the business conference is well after the upcoming event 226 of the baby party, the generate interaction module 1112 can alert the search target 1122 with the initial interaction request 1146 after the upcoming event 226 where the user 230 and the search target 1122 can have an opportunity to at least meet. The initial interaction request 1146 can provide only the minimal information 1150 and the brief note 1154 along with the reminder information 1152 where the user 230 and the search target 1122 met at the baby birthday party. Generally speaking, the generate interaction module 1112 can factor in a temporal distance 1158 from a present time to the time of the future interaction opportunity 902 to determine the amount of information is included in the initial interaction request 1146, the detailed interaction request 1148, or a combination thereof. The temporal distance 1158 is the time between two events.

As another example of timing, if the degree of separation 1142 between the user 230 and the search target 1122 is one of known acquaintance where the two have not interacted in a while, the generate interaction module 1112 can generate the initial interaction request 1146 with more than the minimal information 1150, the reminder information 1152, and the brief note 1154. The initial interaction request 1146 can also include the bullet points 606 highlighting past interactions between the user 230 and the search target 1122 or just about the search target 1122.

If the search target 1122 responds positively to the initial interaction request 1146 for the future interaction opportunity 902, the generate interaction module 1112 can generate the detailed interaction request 1148 with more specific information about the future interaction opportunity 902, such as geographic location, date, time, or event name. The additional specific information can be based on a tiered sharing protocol 1162 for the detailed interaction request 1148 following the initial interaction request 1146. The tiered sharing protocol 1162 provides a mechanism to successively increase the information shared with another party.

A sharing increment 1164 for the additional information or specificity added in the detailed interaction request 1148 based on the tiered sharing protocol 1162 can be also be limited to maximize privacy for the search target 1122 with the target privacy setting 1124. The sharing increment 1164 is the change amount in the additional information or the specificity of information from one interaction request to a subsequent interaction request. The sharing increment 1164 can also be affected by the temporal distance 1158 from a present time or the upcoming event 226 to the future interaction opportunity 902. There can be more than one alert for the detailed interaction request 1148, each subsequent potentially providing more information than the previous.

One example of the tiered sharing protocol 1162 for the detailed interaction request 1148 can be based on the information first provided in the initial interaction request 1146. The initial interaction request 1146 can provide the brief note 1154 for the future interaction opportunity 902 to reconnect with the user 230 in a couple of months and inquiring the search target 1122 would be interested in reconnecting around that time frame. Generally speaking, the generate interaction module 1112 can send the initial interaction request 1146 well in advance of the future interaction opportunity 902 to allow the search target 1122 to plan and consider the initial interaction request 1146.

If the search target 1122 response is positive, then the generate interaction module 1112 can provide the detailed interaction request 1148 with the tiered sharing protocol 1162 to provide more information compared to the initial interaction request 1146. For this example, perhaps general geography, e.g. state or city, and general time, e.g. month or week of month. As the search target 1122 continues to provide positive responses, the generate interaction module 1112 can provide more specifics in subsequent instances of the detailed interaction request 1148 through the specifics of the clear identifiable information about time, location, and even the name of the business conference where the user 230 can meet with Joe as the search target 1122.

As the degree of separation 1142 decreases, more information between the user 230 of FIG. 2 and the search target 1122. The additional information can be fed to the aggregate module 1104, the generate recommendation module 1106, or a combination thereof such that the additional information can affect or refine the recommendations 340 of FIG. 3 for the search target 1122 in the future or even for the future interaction opportunity 902.

Using the example in FIG. 9, even if the search target 1122 declines the future interaction opportunity 902 with the user 230 at the business conference, the generate interaction module 1112 can generate the initial interaction request 1146 for the future interaction opportunity 902 for golfing. In this example, the golfing activity can be the common interest 1144 between the user 230 and the search target 1122. The generate interaction module 1112 can also identify the future interaction opportunity 902 based on the common interest 1144.

The generate interaction module 1112 can determine the amount or specificity of information in the initial interaction request 1146, the detailed interaction request 1148, or a combination thereof based on the user's privacy setting 1138. If the user's privacy setting tends to lean towards maximum privacy, then the generate interaction module 1112 can generate the initial interaction request 1146 with the minimal information 1150, the reminder information 1152, or a combination thereof. The sharing increment 1164 for the additional information or specificity added in the detailed interaction request 1148 based on the tiered sharing protocol 1162 can be also be limited to maximize privacy for the user 230.

On the other hand, if the user's privacy setting 1138 is configured to share more information, then the generate interaction module 1112 can provide more than the minimal information 1150 in the initial interaction request 1146. The tiered sharing protocol 1162 can provide the sharing increment 1164 to allow for a more rapid rate of sharing information to subsequent request as the detailed interaction request 1148 as compared to the earlier example.

The generate interaction module 1112 can operate with the build graph module 1108. The build graph module 1108 can decrease the degree of separation 1142, or improve the closeness, between the user 230 and the search target 1122 based on the interactions at the upcoming event 226, the future interaction opportunity 902, or a combination thereof. The build graph module 1108 can decrease the degree of separation 1142 with more instances of the future interaction opportunity 902. The build graph module 1108 can decrease the degree of separation 1142 despite the fact that the search target 1122 declined one or more of the future interaction opportunity 902 depending on the responses to the initial interaction request 1146 or the detailed interaction request 1148.

The generate interaction module 1112 can also provide specific information in the initial interaction request 1146 and not need to send the detailed interaction request 1148 if, for example, the degree of separation 1142 between the user 230 and the search target 1122 is that of a close friend who regularly interacts. Similarly, the generate interaction module 1112 can still send the initial interaction request 1146 having only the minimal information 1150 to the search target 1122 who is a close friend. In this example, the tiered sharing protocol 1162 can subsequently allow the detailed interaction request 1148 to have the sufficient information for the future interaction opportunity 902 between two close friends and no other notification is required.

The modules described in this application can be part of the first software 1026 of FIG. 10, the second software 1042 of FIG. 10, or a combination thereof. These modules can also be stored in the first storage unit 1014 of FIG. 10, the second storage unit 1046 of FIG. 10, or a combination thereof. The first control unit 1012, the second control unit 1034, or a combination thereof can execute these modules for operating the computing system 100.

The computing system 100 has been described with module functions or order as an example. The computing system 100 can partition the modules differently or order the modules differently. For example, the detect event module 1102 and the monitor module 1110 can be within one module or portions of each can be shared. Also, the iterations or loops described can include other modules between those described in the loops. Further, the future interaction opportunity 902 can be viewed as the upcoming event 226 such that the generate recommendation module 1106 can generate the recommendations 340 for the user 230 for the future interaction opportunity 902.

The modules described in this application can be hardware implementation, hardware accelerators, or hardware circuitry in the first control unit 1012 of FIG. 10 or in the second control unit 1034 of FIG. 10. The modules can also be hardware implementation, hardware accelerators, or hardware circuitry within the first device 102 or the second device 106 but outside of the first control unit 1012 or the second control unit 1034, respectively. However, it is understood that the first control unit 1016, the second control unit 1038, or a combination thereof can collectively refer to all hardware accelerators for the modules.

The modules described in this application can be implemented as instructions stored on a non-transitory computer readable medium to be executed by a first control unit 1012, the second control unit 1036, or a combination thereof. The non-transitory computer medium can include the first storage unit 1014 of FIG. 10, the second storage unit 1046 of FIG. 10, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

Further, the control flow can include a method 1170 of operation of a computing system 100 in an embodiment of the present invention. The method 1170 includes: detecting an upcoming event, with an with a control unit, for interacting with a focal person for the upcoming event; extracting an invitee's identification for the upcoming event; aggregating an invitee's information associated with the invitee's identification; building a social graph as an enhanced graph or with an extension graph based on the invitee's information for adding an invitee associated with the invitee's identification for displaying on a device; and storing the social graph.

It has been discovered that the computing system 100 provides improved interaction opportunities with new or stale contacts. The computing system 100 aggregates information from various sources to help create context for a conversation for the user 230 to connect with a new contact or to reconnect with a stale contact, as described as the search target 1122 or one of the invitees 336 in the example earlier, derived originally from the event details 332 of the upcoming event 226.

It has also been discovered that the computing system 100 provides the opportunity for improved interactions between a new contact and a stale contact while preserving privacy. The tiered sharing protocol 1162 can provide a tiered details of information exchanges between the user 230 and the search target 1122 using the initial interaction request 1146, the detailed interaction request 1148, and responses from the search target 1122.

It has been further discovered that the computing system 100 provides an efficient query and response exchange for determining an acceptance of the future interaction opportunity 902 based on the degree of separation 1142 between the user 230 and the search target 1122. The closer the user 230 and the search target 1122 are, the lower the value for the degree of separation 1142 allowing the computing system 100 to more quickly provide specific information for the future interaction opportunity 902 while minimizing the exchanges using the initial interaction request 1146, the detailed interaction request 1148, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system for social interaction comprising:
   a control unit, including a hardware processor, configured to:
   detect an upcoming event including a purpose of the upcoming event;
   extract an invitee's identification for the upcoming event;
   aggregate supplemental information, including an invitee's information associated with the invitee's identification, beginning with event information of the upcoming event, wherein the supplemental information is gathered from different types of social networks;

build a social graph as an enhanced graph or with an extension graph based on the supplemental information from the different types of social networks, including the invitee's information for adding an invitee associated with the invitee's identification;

generate a conversation context about the invitee based on the supplemental information for interacting with the invitee at the upcoming event, wherein the conversation context includes relevant information associated with one of the social networks based on the invitee's information for interacting with the invitee at the upcoming event;

identify a common interest between a user of the social networks and the invitee based on the invitee's information; and a storage unit, including a memory unit, coupled to the control unit, configured to store the social graph.

2. The system as claimed in claim 1 wherein the control unit is configured to extend the social graph of a network type based on a target privacy setting.

3. The system as claimed in claim 1 wherein the control unit is configured to monitor the invitee's information based on a target privacy setting for a future interaction opportunity.

4. The system as claimed in claim 1 wherein the control unit configured to:
monitor the invitee's information based on the common interest for a future interaction opportunity.

5. The system as claimed in claim 1 wherein the control unit configured to:
monitor the invitee's information for a future interaction opportunity; and
generate an interaction request based on a user's privacy setting for interacting with the invitee at the future interaction opportunity.

6. The system as claimed in claim 1 wherein the control unit is configured to generate an interaction request based on a tiered sharing protocol for interacting with the invitee.

7. The system as claimed in claim 1 wherein the control unit is configured to add the invitee's identification with a degree of separation based on the invitee's information.

8. The system as claimed in claim 1 wherein the control unit is configured to:
generate an interaction request based on a tiered sharing protocol for interacting with the invitee; and
adjust a sharing increment for the tiered sharing protocol based on a temporal distance for interacting with the invitee.

9. The system as claimed in claim 1 wherein the control unit is configured to:
provide a recommendation for an item selection based on a context of the upcoming event.

10. A method of operation of a computing system for social interaction comprising:
detecting an upcoming event including a purpose of the upcoming event;
extracting an invitee's identification for the upcoming event;
aggregating supplemental information, including an invitee's information associated with the invitee's identification, beginning with event information of the upcoming event, wherein the supplemental information is gathered from different types of social networks;
building a social graph as an enhanced graph or with an extension graph based on the supplemental information from the different types of social networks, including the invitee's information for adding an invitee associated with the invitee's identification;
generating a conversation context about the invitee based on the supplemental information for interacting with the invitee at the upcoming event, wherein the conversation context includes relevant information associated with one of the social networks based on the invitee's information for interacting with the invitee at the upcoming event;
identifying a common interest between a user of the social networks and the invitee based on the invitee's information; and
storing the social graph.

11. The method as claimed in claim 10 wherein building the social graph includes extending the social graph of a network type based on a target privacy setting.

12. The method as claimed in claim 10 further comprising monitoring the invitee's information based on a target privacy setting for a future interaction opportunity.

13. The method as claimed in claim 10 further comprising:
monitoring the invitee's information based on the common interest for a future interaction opportunity.

14. The method as claimed in claim 10 further comprising:
monitoring the invitee's information for a future interaction opportunity; and
generating an interaction request based on a user's privacy setting for interacting with the invitee at the future interaction opportunity.

15. The method as claimed in claim 10 further comprising generating an interaction request based on a tiered sharing protocol for interacting with the invitee.

16. The method as claimed in claim 10 wherein building the social graph includes adding the invitee's identification with a degree of separation based on the invitee's information.

17. The method as claimed in claim 10 further comprising:
generating an interaction request based on a tiered sharing protocol for interacting with the invitee; and
adjusting a sharing increment for the tiered sharing protocol based on a temporal distance for interacting with the invitee.

18. The method as claimed in claim 10 further comprising:
providing a recommendation for an item selection based on the context of the upcoming event.

19. A non-transitory computer readable medium including instructions for execution of a computing system for social interaction comprising:
detecting an upcoming event including a purpose of the upcoming event;
extracting an invitee's identification for the upcoming event;
aggregating supplemental information, including an invitee's information associated with the invitee's identification, beginning with event information of the upcoming event, wherein the supplemental information is gathered from different types of social networks;
building a social graph as an enhanced graph or with an extension graph based on the supplemental information from the different types of social networks, including the invitee's information for adding an invitee associated with the invitee's identification;

generating a conversation context about the invitee based on the supplemental information for interacting with the invitee at the upcoming event, wherein the conversation context includes relevant information associated with one of the social networks based on the invitee's information for interacting with the invitee at the upcoming event;

identifying a common interest between a user of the social networks and the invitee based on the invitee's information; and storing the social graph.

20. The medium as claimed in claim 19 wherein building the social graph includes extending the social graph of a network type based on a target privacy setting.

21. The medium as claimed in claim 19 further comprising monitoring the invitee's information based on a target privacy setting for a future interaction opportunity.

22. The medium as claimed in claim 19 further comprising:

monitoring the invitee's information based on the common interest for a future interaction opportunity.

23. The medium as claimed in claim 19 further comprising:

monitoring the invitee's information for a future interaction opportunity; and generating an interaction request based on a user's privacy setting for interacting with the invitee at the future interaction opportunity.

24. The medium as claimed in claim 19 further comprising generating an interaction request based on a tiered sharing protocol for interacting with the invitee.

25. The medium as claimed in claim 19 wherein building the social graph includes adding the invitee's identification with a degree of separation based on the invitee's information.

26. The medium as claimed in claim 19 further comprising:

generating an interaction request based on a tiered sharing protocol for interacting with the invitee; and adjusting a sharing increment for the tiered sharing protocol based on a temporal distance for interacting with the invitee.

27. The medium as claimed in claim 19 further comprising:

providing a recommendation for an item selection based on a context of the upcoming event.

* * * * *